(12) United States Patent
Sun

(10) Patent No.: US 11,012,551 B2
(45) Date of Patent: May 18, 2021

(54) WALKIE-TALKIE DEVICE, ELECTRONIC APPARATUS, WALKIE-TALKIE INFORMATION TRANSMISSION METHOD, AND INFORMATION TRANSMISSION METHOD

(71) Applicant: SHENZHEN WISTEK ENERGY CO., LTD., Guangdong (CN)

(72) Inventor: Hui Sun, Guangdong (CN)

(73) Assignee: Shenzhen Wistek Energy Co., Ltd., Guangdong (CN)

( * ) Notice: Subject to any disclaimer, the term of this patent is extended or adjusted under 35 U.S.C. 154(b) by 0 days.

(21) Appl. No.: 16/635,004

(22) PCT Filed: Jul. 24, 2018

(86) PCT No.: PCT/CN2018/096844
§ 371 (c)(1),
(2) Date: Jan. 29, 2020

(87) PCT Pub. No.: WO2019/024719
PCT Pub. Date: Feb. 7, 2019

(65) Prior Publication Data
US 2020/0244790 A1  Jul. 30, 2020

(30) Foreign Application Priority Data

Aug. 2, 2017  (CN) .......................... 201710651605.0

(51) Int. Cl.
*H04B 7/00* (2006.01)
*H04M 1/72412* (2021.01)
(Continued)

(52) U.S. Cl.
CPC ..... *H04M 1/72412* (2021.01); *G10L 15/1822* (2013.01); *H04B 17/318* (2015.01);
(Continued)

(58) Field of Classification Search
CPC ........... H04M 1/7253; H04M 1/72541; H04M 2215/2093; H04B 17/318; H04W 4/90;
(Continued)

(56) References Cited

U.S. PATENT DOCUMENTS 3,321,580 A * 5/1967 Horne .................. H04M 9/001
379/388.05
4,748,685 A * 5/1988 Rozanski, Jr. ...... H02J 7/00047
455/218
(Continued)

FOREIGN PATENT DOCUMENTS

CN  202759497  2/2013
CN  106792280  5/2017
(Continued)

OTHER PUBLICATIONS

International Search Report of corresponding International Patent Application No. PCT/CN2018/096844; filed on Jul. 24, 2018.

*Primary Examiner* — April G Gonzales
(74) *Attorney, Agent, or Firm* — Duane Morris LLP

(57) ABSTRACT

Disclosed are a walkie-talkie and a walkie-talkie information transmission method. The walkie-talkie includes: an interconnection communication module, configured to establish short-range communication with an interconnection terminal; a radio frequency module, configured to establish radio frequency communication with another walkie-talkie; an internal communication interface; and a processor connected to the interconnection communication module and the radio frequency module through the internal communication interface; the processor is configured to: receive, through the interconnection communication module, a first signal sent by the interconnection terminal towards the other walkie-talkie, process the first signal to obtain a second signal, and send the second signal to the other walkie-talkie through the radio frequency module; or
(Continued)

receive, through the radio frequency module, a third signal sent by the other walkie-talkie towards the interconnection terminal, process the third signal to obtain a fourth signal, and send the fourth signal to the interconnection terminal through the interconnection communication module.

18 Claims, 9 Drawing Sheets

(51) Int. Cl.
| | | |
|---|---|---|
| *H04B 17/318* | (2015.01) | |
| *H04W 4/90* | (2018.01) | |
| *H04W 4/80* | (2018.01) | |
| *G10L 15/18* | (2013.01) | |
| *H04L 29/06* | (2006.01) | |
| *H04Q 5/24* | (2006.01) | |
| *H04W 4/10* | (2009.01) | |
| *H04M 1/72424* | (2021.01) | |

(52) U.S. Cl.
CPC ........ *H04L 69/14* (2013.01); *H04M 1/72424* (2021.01); *H04Q 5/24* (2013.01); *H04W 4/10* (2013.01); *H04W 4/80* (2018.02); *H04W 4/90* (2018.02); *H04M 2215/2093* (2013.01)

(58) Field of Classification Search
CPC ...... H04W 4/80; H04W 4/10; G10L 15/1822; H04L 69/14; H04Q 5/24
USPC ...................................................... 455/41.2
See application file for complete search history.

(56) References Cited

U.S. PATENT DOCUMENTS

| | | | | |
|---|---|---|---|---|
| 4,792,986 | A * | 12/1988 | Garner | H04B 1/20 455/186.2 |
| 6,205,338 | B1 * | 3/2001 | Kim | H04M 1/72513 455/462 |
| 9,351,077 | B1 * | 5/2016 | Ford | H04R 5/02 |
| 2004/0192362 | A1 * | 9/2004 | Vicari | H04B 7/18506 455/507 |
| 2006/0040688 | A1 * | 2/2006 | Kuroda | H04W 84/08 455/518 |
| 2008/0076391 | A1 * | 3/2008 | Chen | H04M 3/56 455/411 |
| 2016/0205519 | A1 * | 7/2016 | Patel | H04L 41/5041 455/518 |
| 2016/0227384 | A1 * | 8/2016 | Mazzarella | H04W 12/08 |
| 2016/0227588 | A1 * | 8/2016 | Patel | H04W 92/02 |
| 2017/0132907 | A1 * | 5/2017 | Lee | H04W 4/80 |

FOREIGN PATENT DOCUMENTS

| | | |
|---|---|---|
| CN | 107222838 | 9/2017 |
| KR | 01728327 | 4/2017 |

* cited by examiner

WALKIE-TALKIE DEVICE, ELECTRONIC APPARATUS, WALKIE-TALKIE INFORMATION TRANSMISSION METHOD, AND INFORMATION TRANSMISSION METHOD

CROSS REFERENCE TO RELATED APPLICATIONS

This application is a national stage application under 35 U.S.C. 371 based on international patent application PCT/CN2018/096844, filed on Jul. 24, 2018 which claims priority to Chinese patent application No. 201710651605.0 filed on Aug. 2, 2017, disclosures of both of which are incorporated herein by reference in their entireties.

This application claims priority to Chinese patent application No. 201710651605.0 filed on Aug. 2, 2017, disclosure of which is incorporated herein by reference in its entirety.

TECHNICAL FIELD

The present disclosure relates to the field of radio transmission, for example, to a walkie-talkie, an electronic device, a walkie-talkie information transmission method and an information transmission method.

BACKGROUND

Walkie-talkies are two-way mobile communication tools which can talk to each other without the support of any radio communication network and extra charges. The walkie-talkies are more applicable to relatively fixed application scenarios in which frequent talks between each other are required. Communication parameters such as a communication frequency, channel and volume of a traditional walkie-talkie may be configured through buttons of the walkie-talkie. After the walkie-talkie is configured with a certain communication channel or frequency, the walkie-talkie can talk to other walkie-talkies with the same communication channel or frequency by pressing a push to talk (PTT) button.

At present, with coverage of mobile communication network signals, users generally implement information interactions at a remote distance by using mobile terminals such as mobile phones. However, in the first aspect, communication with the mobile phones or the like requires a certain amount of communication fees to be paid to a mobile communication network operator. In the second aspect, in some sparsely populated countries or regions, a mobile communication network coverage rate is generally insufficient, so that the mobile phones are no longer suitable for providing the users with communication services in areas without the coverage of mobile communication network signals. In the third aspect, considering that the mobile phones are only applicable to two users and conventionally, one-to-one normal radio communication (between the calling party and the called party) can be performed after the calling party dials and the called party chooses to be connected, for some outdoor sports enthusiasts and extreme sports enthusiasts who like going to some areas for sports or entertainment in groups, one-to-many cluster communication in the state of instant responses to instant calls is required, and the one-to-one communication with only the mobile phones will bring great inconvenience.

SUMMARY

The present application provides a walkie-talkie, an electronic device, a walkie-talkie information transmission method and an information transmission method, so as to save communication fees of mobile communication terminals such as mobile phones in an application scenario with mobile communication network coverage, or solve the problem that the mobile communication terminals such as the mobile phones cannot provide users with communication services in an application scenario without the mobile communication network coverage.

An embodiment of the present application provides a walkie-talkie. The walkie-talkie includes an interconnection communication module, a radio frequency module, an internal communication interface and a processor.

The interconnection communication module is configured to establish short-range communication with an interconnection terminal.

The radio frequency module is configured to establish radio frequency communication with another walkie-talkie.

The processor is connected to the interconnection communication module and the radio frequency module through the internal communication interface and configured to perform steps described below.

A first signal is received through the interconnection communication module, where the first signal is sent by the interconnection terminal towards the other walkie-talkie, the first signal is processed to obtain a second signal, and the second signal is sent to the other walkie-talkie through the radio frequency module.

Alternatively, a third signal is received through the radio frequency module, where the third signal is sent by the other walkie-talkie towards the interconnection terminal, the third signal is processed to obtain a fourth signal, and the fourth signal is sent to the interconnection terminal through the interconnection communication module.

An embodiment of the present application further provides a walkie-talkie information transmission method. The method includes steps described below.

A first signal is received through an interconnection communication module, where the first signal is sent by an interconnection terminal towards another walkie-talkie, and the interconnection terminal pre-establishes a short-range communication connection with the interconnection communication module, the first signal is processed to obtain a second signal, and the second signal is sent to the other walkie-talkie through the radio frequency module.

Alternatively, a third signal is received through the radio frequency module, where the third signal is sent by the other walkie-talkie towards the interconnection terminal, the third signal is processed to obtain a fourth signal, and the fourth signal is sent to the interconnection terminal through the interconnection communication module.

An embodiment of the present application provides an electronic device. The electronic device includes an interconnection communication module, a radio frequency module, an internal communication interface and a processor.

The interconnection communication module is configured to establish short-range communication with an interconnection terminal.

The radio frequency module is configured to establish radio frequency communication with other electronic devices.

The processor is connected to the interconnection communication module and the radio frequency module through the internal communication interface and configured to perform steps described below.

A first signal is received through the interconnection communication module, where the first signal is sent by the interconnection terminal towards the other electronic devices, the first signal is processed to obtain a second signal, and the second signal is sent to the other electronic devices through the radio frequency module.

Alternatively, a third signal is received through the radio frequency module, where the third signal is sent by each of the other electronic devices towards the interconnection terminal, the third signal is processed to obtain a fourth signal, and the fourth signal is sent to the interconnection terminal through the interconnection communication module.

An embodiment of the present application further provides an information transmission method. The method is applied to a first device including an interconnection communication module and a radio frequency module. The method includes steps described below.

A first signal is received through the interconnection communication module, where the first signal is sent by an interconnection terminal towards a second device, and the interconnection terminal has pre-established a short-range communication connection with the interconnection communication module, the first signal is processed to obtain a second signal, and the second signal is sent to the second device through the radio frequency module.

Alternatively, a third signal is received through the radio frequency module, where the third signal is sent by the second device towards the interconnection terminal, the third signal is processed to obtain a fourth signal, and the fourth signal is sent to the interconnection terminal through the interconnection communication module.

DETAILED DESCRIPTION

Figure 1A:
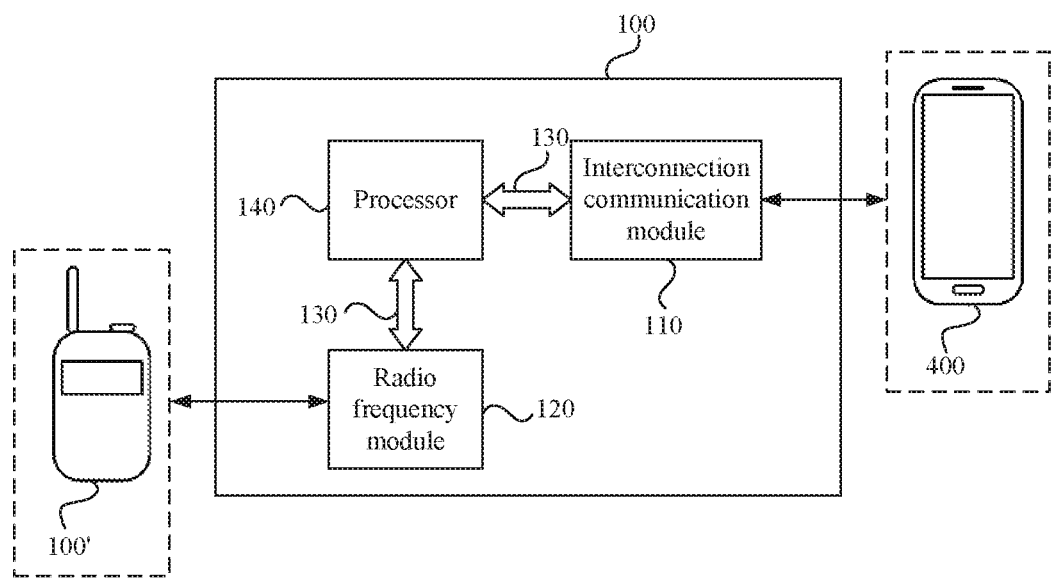
FIG. 1A is a structural diagram of a walkie-talkie according to embodiment one of the present application.

It is to be noted that for ease of description, only part, not all, of the content related to the present application is illustrated in the drawings. Before exemplary embodiments are discussed in more detail, it should be noted that part of the exemplary embodiments are described as processes or methods depicted in flowcharts. Although the flowcharts describe the operations (steps) as sequential processes, many of the operations may be implemented concurrently, coincidentally or simultaneously. Additionally, the sequence of the operations may be rearranged. Each of the processes may be terminated when the operations are completed, but may further have additional steps not included in the drawings. Each of the processes may correspond to a method, a function, a procedure, a subroutine, a subprogram or the like.

Embodiments of the present application provide an electronic device. For ease of description, the electronic device is described by using a walkie-talkie as an example in embodiments described below. However, the electronic device provided by the embodiments of the present application includes, but is not limited to, the walkie-talkie. The electronic device provided by the embodiments of the present application may also be another device. Similarly, the embodiments of the present application provide an information transmission method, which is described by using a walkie-talkie information transmission method as an example in the embodiments described below. The information transmission method provided by the embodiments of the present application includes, but is not limited to, the walkie-talkie information transmission method.

Embodiment One

This embodiment is applicable to an application scenario in which information interactions are implemented between interconnection terminals without the coverage of mobile communication network signals. As shown in FIG. 1A, a walkie-talkie 100 includes an interconnection communication module 110, a radio frequency module 120, an internal communication interface 130 and a processor 140. The interconnection communication module 110 is configured to establish short-range communication with an interconnection terminal 400. The radio frequency module 120 is configured to establish radio frequency communication with another walkie-talkie 100'. The processor 140 is connected to the interconnection communication module 110 and the radio frequency module 120 through the internal communication interface 130.

When the processor 140 is applied to the walkie-talkie 100 on a sending side, the processor 140 may be configured to perform method steps S101 to S103 described below.

In S101, a first signal is received through the interconnection communication module 110, where the first signal is sent by the interconnection terminal 400 towards the other walkie-talkie 100'.

In S102, the first signal is processes to obtain a second signal.

In S103, the second signal is sent to the other walkie-talkie 100' through the radio frequency module 120.

When the processor 140 is applied to the walkie-talkie 100 on a receiving side, the processor 140 may be configured to perform method steps S111 to S113 described below.

In S111, a third signal is received through the radio frequency module 120, where the third signal is sent by the other walkie-talkie 100' towards the interconnection terminal 400.

In S112, the third signal is processes to obtain a fourth signal.

In S113, the fourth signal is sent to the interconnection terminal 400 through the interconnection communication module 110.

The interconnection communication module 110 may be a Bluetooth communication module, a wireless fidelity (wifi) communication module, an infrared communication module and a near filed communication (NFC) connection module, as long as the interconnection communication module 110 can perform the short-range communication with various types of interconnection terminal 400. The present application does not make any limitation on the interconnection communication module 110. However, for ease of description, the present application subsequently provides an exemplary description of the interconnection communication module 110 by using the Bluetooth communication module as an example.

The internal communication interface 130 may be a common inter-chip communication interface such as a serial peripheral interface (SPI), an inter-integrated circuit (I2C) or a universal asynchronous receiver/transmitter (UART). In an embodiment, when the communication interface 130 (such as the I2C interface) is determined, a preset communication protocol (that is, an I2C bus protocol) is accordingly determined. The present application does not make any limitation on the type and the specifications of the communication interface 130.

However, for ease of description, the present application subsequently provides an exemplary description of the internal communication interface 130 by only using the I2C interface as an example.

In an embodiment, the application scenario of the walkie-talkie 100 includes several walkie-talkies 100 shown in FIG. 1A and interconnection terminals 400 in a one-to-one correspondence to the walkie-talkies 100. The interconnection terminal 400 and the walkie-talkie 100 are used in cooperation with each other. Based on user's usage habits, the interconnection terminal 400 may be used to implement talks with other interconnection terminals 400, and the walkie-talkie 100 is carried with the user, for example, in a backpack. The interconnection terminal 400 may be a smart terminal such as a mobile phone. The present application does not make any limitation on the interconnection terminal 400. However, for ease of description, the present application subsequently provides an exemplary description of the interconnection terminal 400 by using the mobile phone as an example.

In an embodiment, the mobile phone (i.e., the interconnection terminal 400) may be pre-developed with an application (APP), and then the APP is installed in advance in the mobile phone to provide a friendly user operation interface via which the walkie-talkie 100 is used, controlled and configured. After a short-range communication connection between the walkie-talkie 100 and the mobile phone is established through the Bluetooth communication module, the user can send a signal or check the received radio signal or information through the APP on the mobile phone.

Figure 1B:
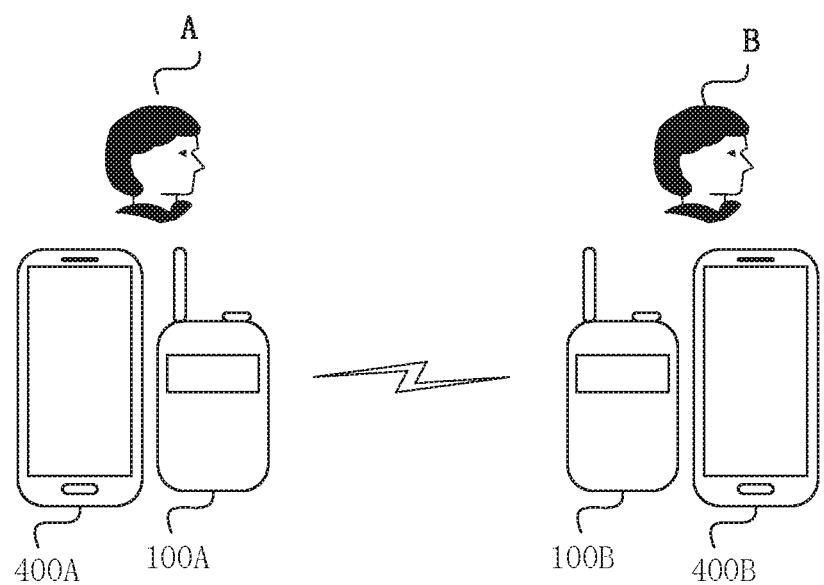
FIG. 1B is a schematic diagram of an application scenario of a walkie-talkie according to embodiment one of the present application.

In an embodiment, in an application scenario where there is no mobile communication network coverage and the walkie-talkies 100 are located within an effective communication distance of each other, as shown in FIGS. 1A and 1B, a walkie-talkie function implemented between two walkie-talkies (for example, a walkie-talkie 100A and a walkie-talkie 100B) is used as an example for description, where the walkie-talkie 100A and the walkie-talkie 100B are on a same channel or a same frequency. For example, a user A sends a signal to be sent through the APP on a mobile phone 400A, and the processor 140 in the walkie-talkie 100A receives the signal to be sent, that is, the first signal, through the Bluetooth communication module (i.e., the interconnection communication module 110). The processor 140 processes the first signal to obtain the second signal, and transmits the second signal to the radio frequency module 120 through the I2C interface (corresponding to the internal communication interface 130). The radio frequency module 120 receives the second signal and sends the second signal through a radio frequency network to the walkie-talkie 100B. The processor 140 in the walkie-talkie 100B receives, through the radio frequency module 120, a radio signal, i.e., the third signal, sent by the walkie-talkie 100A towards a mobile phone 400B. The processor 140 processes the third signal to obtain the fourth signal, and transmits the fourth signal through the I2C interface to the Bluetooth communication module. After receiving the fourth signal, the Bluetooth communication module sends the fourth signal to the mobile phone 400B through a Bluetooth radio network. A user B can check the received fourth signal through the APP on the mobile phone 400B.

In an embodiment, in an application scenario where there is mobile communication network coverage, both the walkie-talkie 100A and the walkie-talkie 100B are within the effective communication distance of each other and on the same channel or at the same frequency, the walkie-talkie function can similarly be implemented between the mobile phone 400A and the mobile phone 400B through the walkie-talkie 100A and the walkie-talkie 100B in this embodiment, and the communication method is the same as that described above.

Figure 1C:
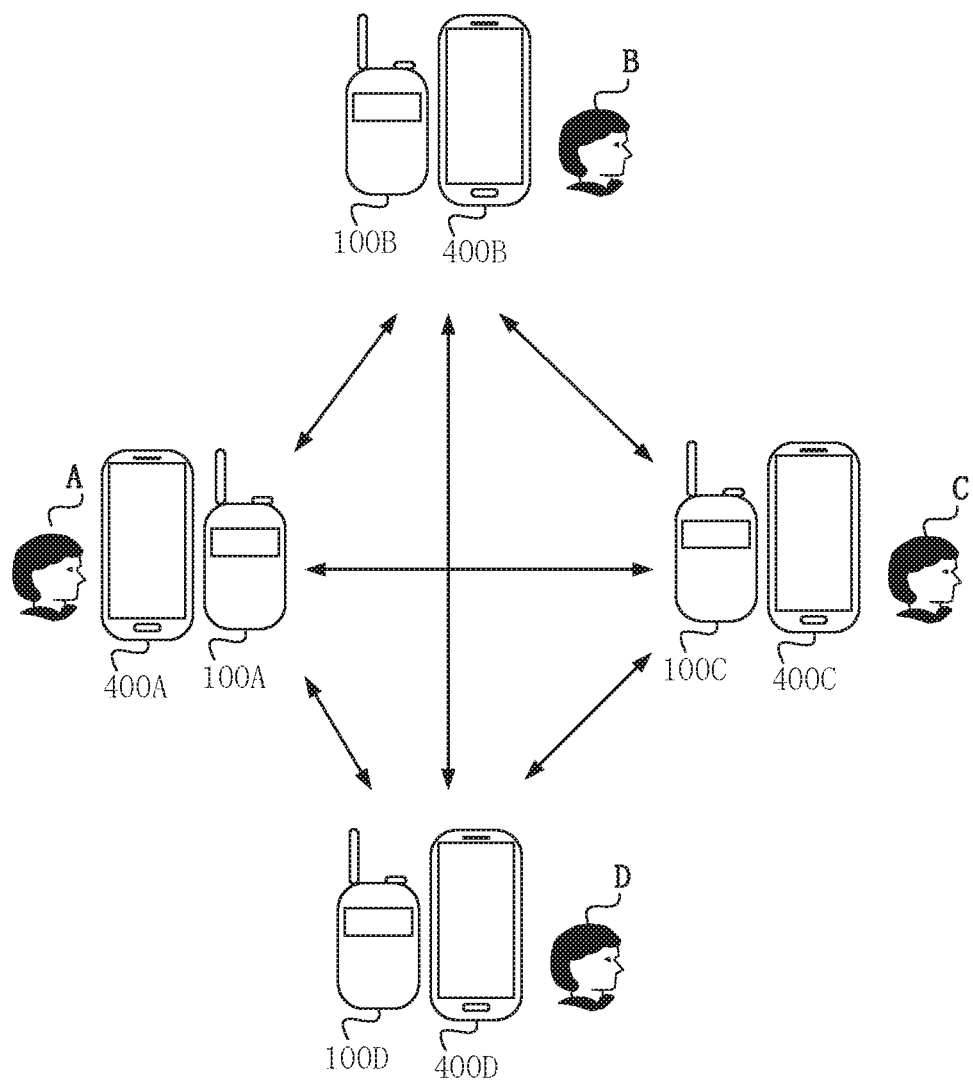
FIG. 1C is a schematic diagram of an application scenario of multiple walkie-talkies according to embodiment one of the present application.

In an application scenario where multiple walkie-talkies 100 each are within the effective communication distance of each other regardless of the presence or absence of the mobile communication network coverage, any two of the multiple walkie-talkies 100 may implement the walkie-talkie function and may also implement a group communication function. As shown in FIG. 1C, four walkie-talkies constitute one group, which is used as an example, where walkie-talkies 100A, 100B, 100C and 100D are all within the effective communication distance of each other and are on the same channel or at the same frequency. The user A sends information within the group through the walkie-talkie 100A by use of the mobile phone 400A (the information may be simple voice information, and may also be a text, a picture, positioning information or video multimedia information). The information is not dedicatedly sent to a certain designated walkie-talkie 100 but group information for the channel or the frequency. The walkie-talkies 100B, 100C and 100D can all receive the information, and accordingly, users B, C and D can all check the information on mobile phones 400B, 400C and 400D respectively.

Similarly, the users B, C and D may also send information to the other users in the group in the same way as the user A, and the other users receive the information on the corresponding mobile phones, thereby implementing intra-group communication and data exchanges.

This embodiment provides the walkie-talkie 100, so that in a scenario where the walkie-talkie 100A, the walkie-talkie 100B, the mobile phone 400A and the mobile phone 400B are in cooperation with each other, the mobile phone 400A and the mobile phone 400B can implement the walkie-talkie function similar to the traditional walkie-talkie through the walkie-talkie 100A and the walkie-talkie 100B. When there is no mobile communication network coverage and the user A and the user B cannot perform information interactions at a remote distance by use of the mobile phone 400A and the mobile phone 400B respectively, the mobile phone 400A and the mobile phone 400B can implement the walkie-talkie function through the walkie-talkie 100A and the walkie-talkie 100B so as to perform the information interactions, thereby solving the problem that the mobile phone 400A and the mobile phone 400B cannot provide the user A and the user B with radio communication services in the application scenario without the mobile communication network coverage. In the application scenario with the mobile communication network coverage, the user A and the user B perform the information interactions by use of the mobile phone 400A and the mobile phone 400B through the walkie-talkie 100A and the walkie-talkie 100B, certain radio communication costs can be saved especially when a specific group (such as the users A, B, C and D) needs to communicate with each other frequently within a wide range.

In an embodiment, a type of each of the first signal and the third signal includes a voice, a text, a geographic position, an image or a video.

The voice, the text, the geographic position, the image or the video may all be sent through the APP installed in the mobile phones 400A and 400B, which may be inputted in real time or may be pre-stored in the mobile phones 400A and 400B. The geographic position may be map information. In case of a danger, sending the map information for help can effectively improve the success rate of rescue.

In addition, the walkie-talkie 100 provided by this embodiment further has a data transmission function. The pre-developed phone APP may also be installed in the walkie-talkie 100. In the application scenario without the mobile communication network coverage, information data received by the user A and the user B through the information interactions by means of the walkie-talkie 100A and the walkie-talkie 100B may be temporarily stored in the mobile phone 100A and the mobile phone 100B. After the mobile communication network coverage exists, the mobile phone 400A and the mobile phone 400B may access a mobile communication network, and the user A and the user B may synchronize the information data stored in the mobile phone 400A and the mobile phone 400B to a network server corresponding to the APP. When the user A or the user B wants to check a previous information interaction record later, in the case of the mobile communication network coverage, the information interaction record previously synchronized to the network server is checked through the APP on the walkie-talkie 100A or the walkie-talkie 100B, or on the mobile phone 400A or the mobile phone 400B.

With the walkie-talkie and the walkie-talkie information transmission method provided by this embodiment, the mobile phone 400A and the mobile phone 400B implement the walkie-talkie function through the walkie-talkie 100A and the walkie-talkie 100B, and the type of the transmitted signal includes the voice, text, geographic position, image or video, which overcomes the defect of a failure to send text information, image information and video information between traditional walkie-talkies.

The processor 140 is further configured to perform steps described below.

A seventh signal is received through the interconnection communication module 110, where the seventh signal is sent by the interconnection terminal 400 towards the walkie-talkie 100.

The seventh signal is parsed to obtain a parsing result.

A system parameter of the walkie-talkie 100 is adjusted based on the parsing result and according to a preset adjustment rule, where the system parameter includes at least one of: a country, a language, a transmitting frequency, a receiving frequency, a channel, a transmitting continuous tone-coded squelch system (CTC), a receiving CTC, a volume or a squelch detector (SQ).

The user A may set the above-mentioned parameters of the walkie-talkie 100A through the APP installed in the mobile phone 100A. The user A sends a command signal for the related setting through the APP installed in the mobile phone 100A. After the command signal is transmitted to the walkie-talkie 100A through the Bluetooth communication module, the processor 140 parses the received command signal, that is, the seventh signal, and adjusts system settings of the walkie-talkie 100A.

The walkie-talkie and the walkie-talkie information transmission method provided by this embodiment, when compared with the adjustment of the system settings of the walkie-talkie 100A or 100B through PTT, an operation method in which the system settings of the walkie-talkie 100A or 100B are adjusted by using the APP installed in the mobile phone 400A or 400B is more intuitive and simple.

A unified communication protocol is used for implementing various functions between walkie-talkies 100 and between the walkie-talkie 100 and the interconnection terminal 400. That is, data transmitted between the walkie-talkies 100 and between the walkie-talkie 100 and the interconnection terminal 400 adopts a unified data encapsulation format. A defined data packet encapsulation format is shown in Table 1.

TABLE 1

Data packet encapsulation format

| Type | Length | Data | Verify |
| --- | --- | --- | --- |

In Table 1, Type denotes a type of a data packet, Length denotes a length of the data packet, Data is content of the data packet, and Verify denotes a check code. Type occupies 1 byte and the type includes a country setting, a language setting, a transmitting frequency setting, a receiving frequency setting, a channel setting, a transmitting CTC setting, a receiving CTC setting, a volume setting, an SQ setting, a user ID, text information, geographic information and the like. Length occupies 2 bytes. Verify occupies 1 byte.

Figure 1D:
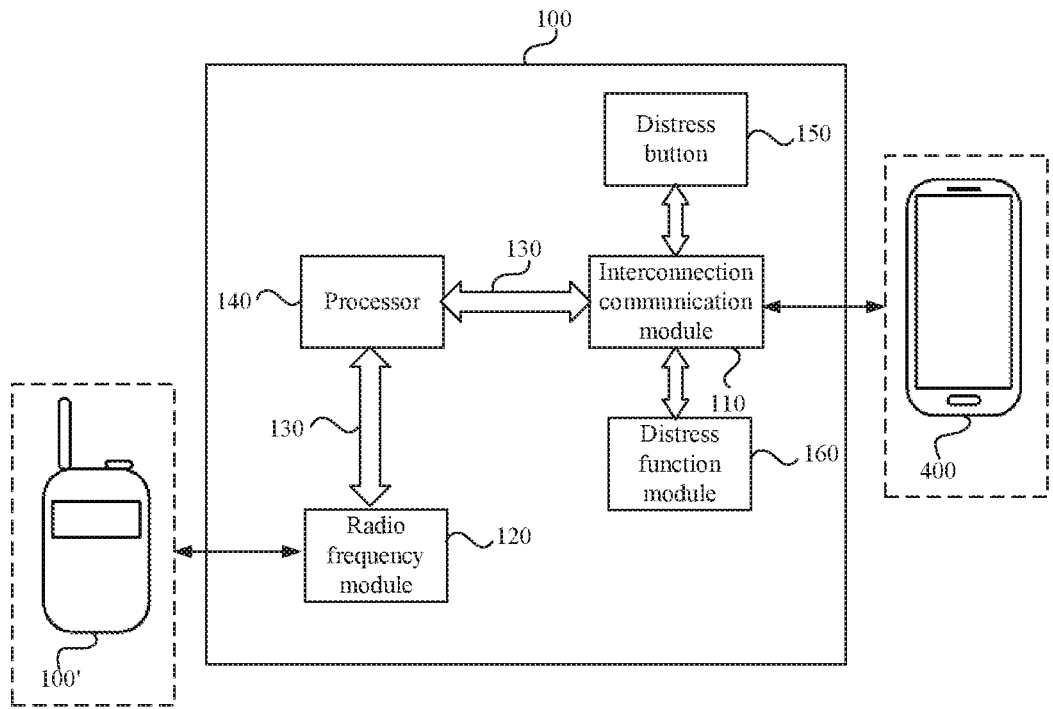
FIG. 1D is a structural diagram of another walkie-talkie according to embodiment one of the present application.

FIG. 1D is a structural diagram of another walkie-talkie according to embodiment 1 of the present application. As shown in FIG. 1D, the walkie-talkie 100 includes the interconnection communication module 110, the radio frequency module 120, the internal communication interface 130 and the processor 140; the walkie-talkie 100 further includes a distress button and a distress function module 160.

The distress button 150 is configured to generate a press operation signal in response to a user's press operation, and send the press operation signal to the interconnection terminal 400 through the interconnection communication module 110, so as to enable the interconnection terminal 400 to identify the press operation signal and generate a distress signal. The distress function module 160 is configured to receive the distress signal from the interconnection terminal 400 through the interconnection communication module 110, and send the distress signal to the other walkie-talkie and receive the distress signal from the other walkie-talkie through the radio frequency module. The distress signal may be a text message, and a preset distance may be the effective communication distance within which the walkie-talkie can communicate with another walkie-talkie. For example, the walkie-talkie is added with an SOS physical button for a Morse code distress signal so as to send the distress signal to all nearby devices. The press operation signal is generated through the button of the device and wirelessly transmitted to the mobile phone. After receiving the press operation signal, the mobile phone identifies the press operation signal, generates the distress signal (text), and sends the distress signal to the walkie-talkie, and then the walkie-talkie sends the distress signal to all the nearby devices.

The embodiments of the present application provide the walkie-talkie and the walkie-talkie information transmission method, where the walkie-talkie includes the interconnection communication module, the processor, the internal communication interface and the radio frequency module, so that the walkie-talkie can establish the short-range communication connection with an interconnection terminal through the interconnection communication module and establish a radio frequency connection with another walkie-talkie through the radio frequency module. The processor processes the signal to be sent which is received through the interconnection communication module and is sent by the interconnection terminal, and sends the processed signal to be sent to the another walkie-talkie through the radio frequency module; or the processor processes the signal to be received which is received through the radio frequency module and is sent by the other walkie-talkie towards the interconnection terminal, and sends the received and processed signal to the interconnection terminal through the interconnection communication module, so that multiple interconnection terminals (such as mobile terminals) can achieve information interactions merely in the traditional walkie-talkie manner by using the walkie-talkie without the support of the mobile communication network, so as to reduce the communication costs of the mobile phone, and the interconnection terminal can perform the information interactions with another interconnection terminal through the radio frequency connection between the walkie-talkie and the other walkie-talkie when the interconnection terminal has no common mobile communication network signals.

Embodiment Two

Figure 2A:
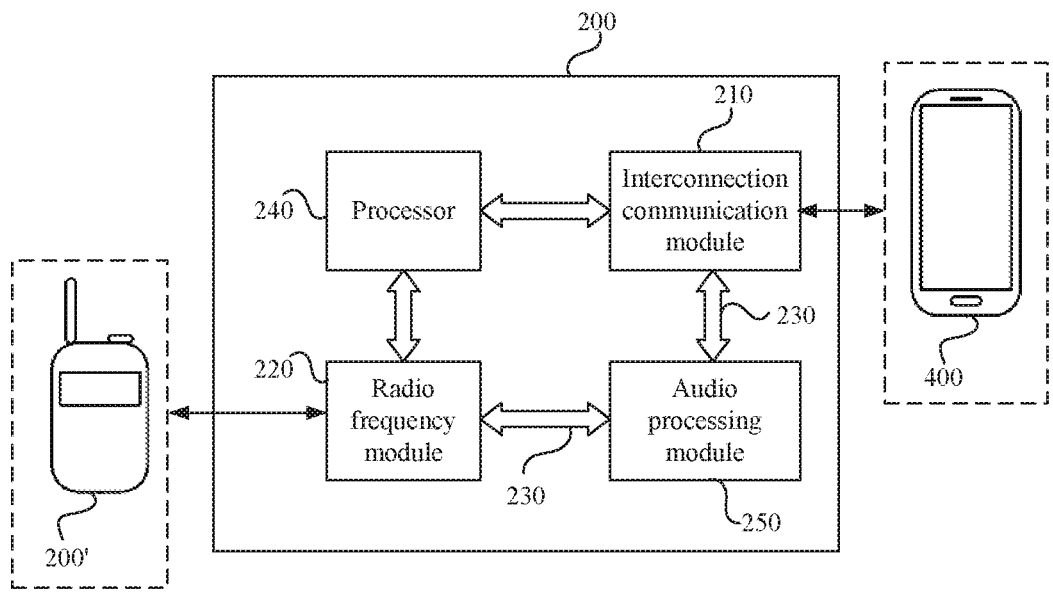
FIG. 2A is a structural diagram of a walkie-talkie according to embodiment two of the present application.

As shown in FIG. 2A, a walkie-talkie 200 in this embodiment further includes an audio processing module 250. The audio processing module 250 is connected to an interconnection communication module 210 and a radio frequency module 220 through an internal communication interface 230. A processor 240 may be further configured to perform steps described below.

If it is determined that a type of a first signal is a voice, the audio processing module 250 is controlled to perform audio processing on the first signal to obtain a second signal.

Alternatively, if it is determined that a type of a third signal is the voice, the audio processing module 250 is controlled to perform the audio processing on the third signal to obtain a fourth signal.

When applied to the walkie-talkie 200 on a sending side, the processor 240 may be configured to perform steps S201 to S203 described below.

In S201, the first signal is received through the interconnection communication module 210, where the first signal is sent by an interconnection terminal 400 and towards another walkie-talkie 200'.

In S202, if it is determined that the type of the first signal is the voice, the audio processing module 250 is controlled to perform the audio processing on the first signal to obtain the second signal.

In S203, the second signal is sent to the other walkie-talkies 200' through the radio frequency module 220.

When the processor 240 is applied to the walkie-talkie 200 on a receiving side, the processor 240 may be further configured to perform method steps S211 to S213 described below.

In S211, the third signal is received through the radio frequency module 220, where the third signal is sent by the other walkie-talkie 200' and towards the interconnection terminal 400.

In S212, if it is determined that the type of the third signal is the voice, the audio processing module 250 is controlled to perform the audio processing on the third signal to obtain the fourth signal.

In S213, the fourth signal is sent to the interconnection terminal 400 through the interconnection communication module 210.

Figure 2B:
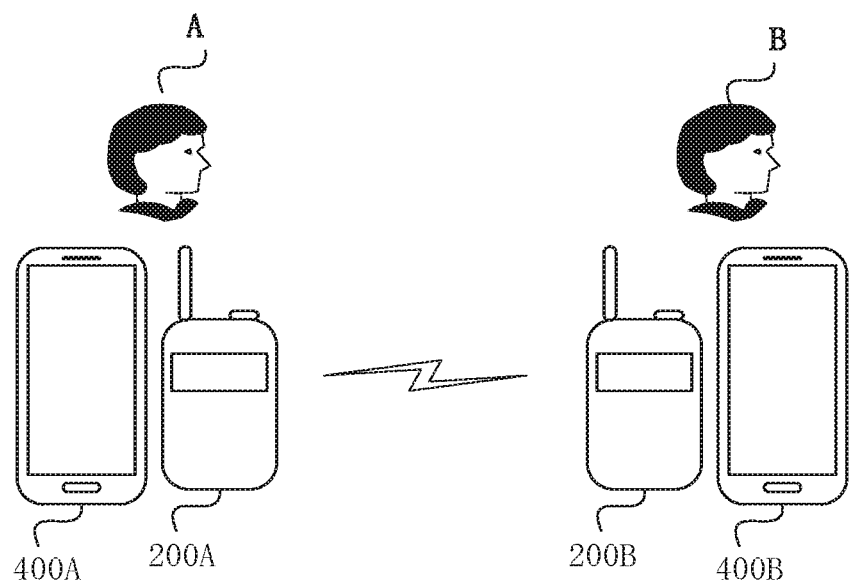
FIG. 2B is a schematic diagram of an application scenario of a walkie-talkie according to embodiment two of the present application.

As shown in FIGS. 2A and 2B, in an application scenario where a user A and a user B send voice signals respectively through walkie-talkies 200A and 200B in this embodiment by use of a mobile phone 400A and a mobile phone 400B, the walkie-talkie 200A and the walkie-talkie 200B are on a same channel or at a same frequency and the user A sends a signal to be sent through an APP in the mobile phone 400A. If the processor 240 in the walkie-talkie 200A determines that the type of the signal to be sent which is received, that is, the first signal is the voice, the processor 240 controls the audio processing module 250 to process the first signal. After the audio processing module 250 processes the first signal to obtain the second signal, the second signal is transmitted to the radio frequency module 220 through an I2C interface (corresponding to the internal communication interface 230). The radio frequency module 220 receives the second signal and sends the second signal through a radio frequency network to the walkie-talkie 200B.

If the processor 240 in the walkie-talkie 200B determines that the type of the signal to be received which is received, that is, the third signal is the voice, the processor 240 controls the audio processing module 250 to process the third signal. After the audio processing module 250 processes the third signal to obtain the fourth signal, the fourth signal is transmitted to a Bluetooth communication module through the I2C interface. After receiving the fourth signal, the Bluetooth communication module sends the fourth signal to the mobile phone 400B through a Bluetooth radio network. The user B can check the received voice signal through the APP in the mobile phone 400B.

In an embodiment, when a type of the fourth signal is the voice, a processor in the mobile phone 400B may acquire rights of a speaker and a sound collector. After receiving the fourth signal, the processor can play voice content carried in the fourth signal in real time and collect the user's sound in real time after the voice is played when a screen is in an off state or a locked state, so as to achieve the effects of real-time sound production and real-time mutual talks.

In another embodiment, when the type of the fourth signal is the voice, after receiving the fourth signal, the processor in the mobile phone 400B can display a voice message prompt box in real time on an interface of the mobile phone and after the voice is played, provide a reply button or a reply box for the user to reply with a voice or a text when the screen is in an off state or a locked state. In this embodiment, the user can perform the voice playback and reply operations when the screen of the mobile phone 400B is in the off state or the locked state. In other embodiments, the user may also unlock the screen and then open the APP to perform the voice playback and the reply operations, which is not limited in the present application.

Based on the embodiment described above, the walkie-talkie 200 further includes a power module.

The power module is configured to supply power to a plurality of modules included in the walkie-talkie 200.

The power module further includes an external power supply interface and is configured to supply power to other portable devices.

The power module in the walkie-talkie 200 in this embodiment may charge a lithium battery in the walkie-talkie 200, may boost a voltage of the lithium battery to 5V and provide the external power supply interface for outputting the voltage of 5V to charge the other portable devices, and provides under-voltage, over-current, over-temperature, short-circuit protection and other functions. For example, the power module may replace other power banks to charge the mobile terminal such as the mobile phone 400A or 400B.

Embodiment Three

Figure 3A:
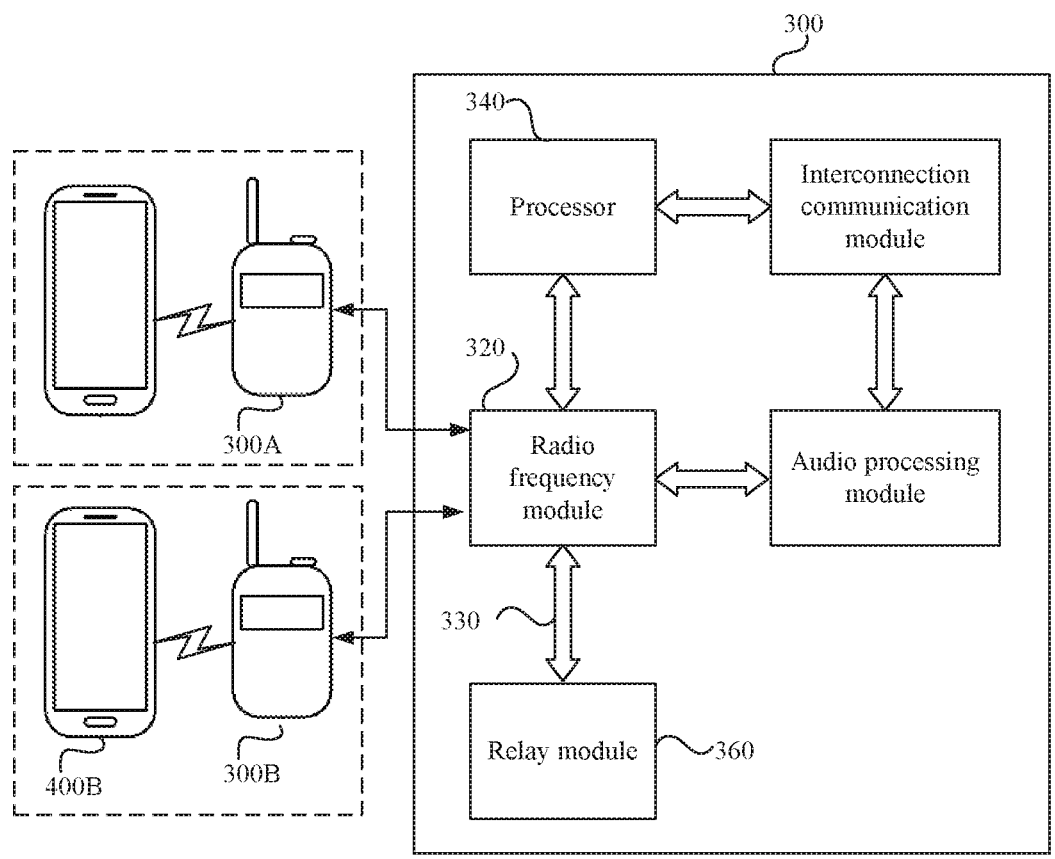
FIG. 3A is a structural diagram of a walkie-talkie according to embodiment three of the present application.

As shown in FIG. 3A, a walkie-talkie 300 in this embodiment further includes a relay module 360. The relay module 360 is connected to a radio frequency module 320 through an internal communication interface 330. A processor 340 may be further configured to perform steps described below.

If it is determined that a received signal is a fifth signal sent by another walkie-talkie 300A and towards another terminal 400B, the relay module 360 is controlled to perform relay processing on the fifth signal to obtain a sixth signal, and the sixth signal is sent to another walkie-talkie 300B through the radio frequency module 320.

When the processor 340 is applied to the walkie-talkie 300 which serves as a relay station, the processor 340 may be configured to perform steps S301 and S302 described below.

In S301, if it is determined that the received signal is the fifth signal which is sent by another walkie-talkie 300A and is towards another interconnection terminal 400B, the relay module 360 is controlled to perform the relay processing on the fifth signal to obtain the sixth signal.

In S302, the sixth signal is sent to another walkie-talkie 300B through the radio frequency module 320.

Generally, an effective communication distance of a radio frequency signal transmitted through the walkie-talkie 300 is about 3 kilometers, and will be shorter in a city with many buildings. If the radio frequency signal is forwarded through the relay station, the effective communication distance of the walkie-talkie 300 can be increased.

Figure 3B:
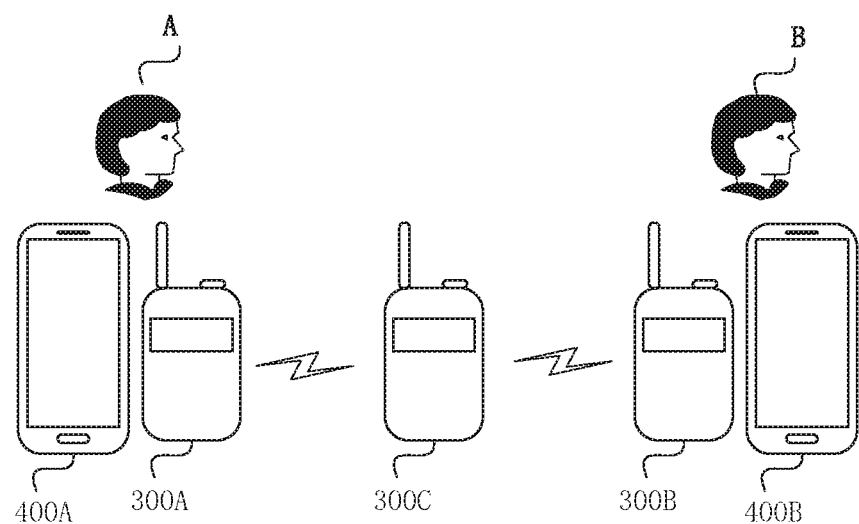
FIG. 3B is a schematic diagram of an application scenario of a walkie-talkie according to embodiment three of the present application.

In an application scenario where there is no mobile communication network coverage and multiple walkie-talkies 300 are all not located within an effective communication distance of each other, as shown in FIGS. 3A and 3B, taking an example in which a signal sent by the walkie-talkie 300A to the walkie-talkie 300B is automatically relayed by the walkie-talkie 300C, the walkie-talkie 300A and the walkie-talkie 300B are not located within the effective communication distance of each other, the walkie-talkie 300C is located within the effective communication distance of the walkie-talkie 300A and the walkie-talkie 300B, and the walkie-talkies 300A, 300B and 300C are on a same channel or at a same frequency.

Any walkie-talkie 300 in this embodiment may implement a relay function. Each walkie-talkie 300 has a special user identification (ID) number. If a signal sent by the walkie-talkie 300 is designated to be received by a certain walkie-talkie 300A, an ID number of the designated walkie-talkie 300A will be marked in a data packet of the signal. Only the walkie-talkie 300A corresponding to this ID number can acquire the content of the data packet. Another walkie-talkie (for example, 300B) can succeed in receiving the data packet but cannot acquire the content of the data packet because the ID number does not match its ID number. Therefore, the confidentiality of the transmitted signal can be achieved. For a signal sent by the walkie-talkie 300 in a broadcast form, if a data packet does not include an ID number of any walkie-talkie, walkie-talkies within the effective communication distance (for example, the walkie-talkie 300A and the walkie-talkie 300B) can all acquire the content of the data packet.

A user A sends a signal to be sent towards the walkie-talkie 300B through the APP in the mobile phone 400A, that is, a first signal. The walkie-talkie 300A sends a second signal obtained by processing the first signal to the walkie-talkie 300B through the radio frequency module 320. Since the walkie-talkie 300B is not located within the effective communication distance of the walkie-talkie 300A, the walkie-talkie 300A cannot receive a receipt message indicating that the walkie-talkie 300B has successfully received the signal. The walkie-talkie 300A will send the second signal through the radio frequency module 320 again and request the signal to be relayed. Any walkie-talkie within the effective communication distance of the walkie-talkie 300A can receive a relay request, and the walkie-talkie 300C is used as an example for description.

The walkie-talkie 300C receives the signal sent by the walkie-talkie 300A through its radio frequency module 320. If the processor 340 in the walkie-talkie 300C determines that the received signal is the signal to be relayed which is sent by the walkie-talkie 300A and is towards the walkie-talkie 300B, that is, the fifth signal, the processor 340 controls the relay module 360 to process the fifth signal. The relay module 360 in the walkie-talkie 300C will perform the relay processing on the fifth signal received through the radio frequency module 320 to obtain the sixth signal and send the sixth signal through the radio frequency module 320. The walkie-talkie 300B receives, through the radio frequency module 320, the signal relayed and forwarded by the walkie-talkie 300C, that is, a third signal. The processor 340 sends a fourth signal obtained by processing the third signal to a mobile phone 400B through a Bluetooth communication module. The user B may check the received fourth signal through the APP in the mobile phone 400B.

When the walkie-talkie 300A sends the relay request, a situation where multiple walkie-talkies can relay the signal might exist. The walkie-talkie 300A may ask the walkie-talkie 300C whether it is free. If the walkie-talkie 300C is free, the walkie-talkie 300C is designated to relay the signal. If the walkie-talkie 300C is not free, the walkie-talkie 300A then asks another walkie-talkie. Alternatively, multiple walkie-talkies may all relay and forward the signal, and the walkie-talkie 300B identifies signals with same data packets and selects to receive only one data packet and discard the remaining data packets. The former asking manner can avoid the wastes of radio frequency network resources.

In an application scenario where the mobile communication network coverage exists and the walkie-talkies 300A and 300B are not located within the effective communication distance of each other, the mobile phones 400A and 400B can also implement a walkie-talkie function through automatic relay and forwarding by the walkie-talkie, and the method is the same as that described above.

The walkie-talkie in this embodiment has the relay function, and forwarding relay signal may be automatically performed by the walkie-talkie 300C for the walkie-talkies 300A and 300B which are not located within the effective communication distance of each other, which overcomes a defect that signals must be relayed by the relay station for the traditional walkie-talkie, and removes limitations of the relay station and provide convenience for the walkie-talkie user.

In an application scenario where multiple walkie-talkies constitute a radio frequency local area network, multiple walkie-talkies 300 are configured on the same channel or at the same frequency, and the multiple walkie-talkies 300 may constitute the radio frequency local area network to achieve arbitrary exchanges of data within the network. For a data exchange manner, the data exchange may be directly performed between two walkie-talkies 300 which are located within the effective communication distance, or the data exchange may be performed between two walkie-talkies 300 which are not located within the effective communication distance through the relay and forwarding by a third walkie-talkie 300.

Figure 3C:
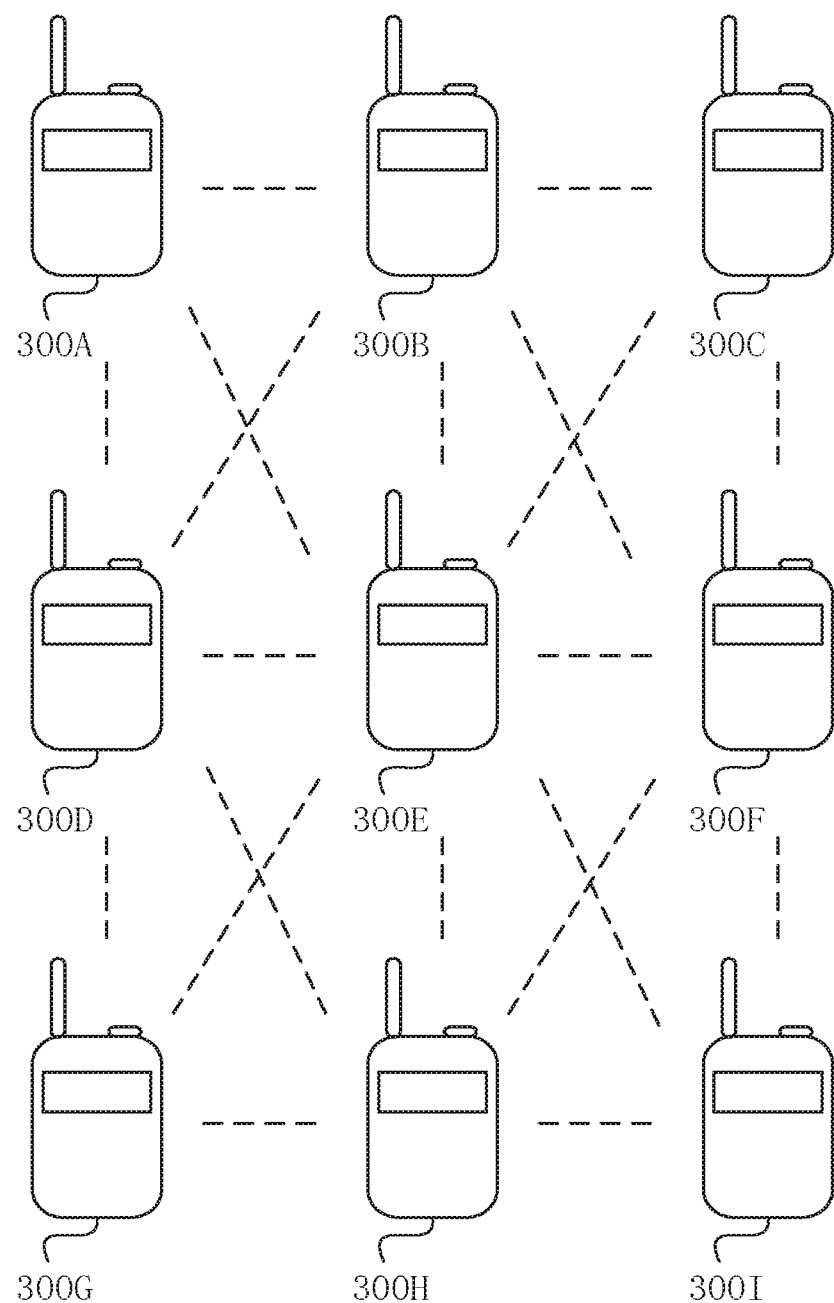
FIG. 3C is a schematic diagram of a radio frequency local area network composed of multiple walkie-talkies according to embodiment three of the present application.

As shown in FIG. 3C, a radio frequency local area network composed of nine walkie-talkies 300 is used as an example, and walkie-talkies 300A, 300B, 300C, 300D, 300E, 300F, 300G, 300H and 300I are configured on the same channel or at the same frequency through APPs in mobile phones which match the nine walkie-talkies respectively.

A signal of the walkie-talkie 300A may be directly transmitted to the walkie-talkie 300B, 300D or 300E.

The signal of the walkie-talkie 300A may be relayed to the walkie-talkie 300C through the walkie-talkie 300B or 300E. When the signal of the walkie-talkie 300A is relayed by the walkie-talkie 300B, the walkie-talkie 300A first checks whether the walkie-talkie 300B is free. If the walkie-talkie 300B is free, the single is relayed by the walkie-talkie 300B to the walkie-talkie 300C. If the walkie-talkie 300B is not free, the walkie-talkie 300A needs to check whether the nearby walkie-talkie 300E is free. If the walkie-talkie 300E is free, data is relayed by the walkie-talkie 300E to the walkie-talkie 300C. In the same way, a signal of the walkie-talkie 300C may be relayed to the walkie-talkie 300A by the walkie-talkie 300B or 300E.

Similarly, the walkie-talkie 300B may transmit a signal to the walkie-talkie 300G through the walkie-talkie 300D or 300E or may transmit the signal to walkie-talkies 300H, 300F and 300I through the walkie-talkie 300E, so that the signal of the walkie-talkie 300A can be transmitted to any one of the other eight walkie-talkies.

Similarly, a signal of the walkie-talkie 300D may be directly transmitted to walkie-talkies 300A, 300G, 300B, 300E and 300H or may also be relayed by walkie-talkie 300B, 300E or 300H to walkie-talkie 300C, 300F or 300I, so that the signal of the walkie-talkie 300D can be transmitted to any one of the other eight walkie-talkies.

Similar to walkie-talkies 300A and 300D, other devices can also achieve any exchange of signals within the network.

The walkie-talkie 300 in this embodiment has the relay function, and the multiple walkie-talkies 300 may constitute a radio frequency local area network. When there is no mobile communication network coverage and users cannot perform information interactions by use of mobile phones, the walkie-talkie function can be implemented through walkie-talkies 300 to perform the information interactions. After the multiple walkie-talkies 300 constitute the radio frequency local area network, great convenience is provided for frequent information interactions of a specific user group within a wide range. Even when the mobile communication network coverage exists, the specific user group can perform the information interactions by use of the radio frequency local area network composed of the multiple walkie-talkies 300, which can save certain radio communication costs.

Embodiment Four

Figure 4A:
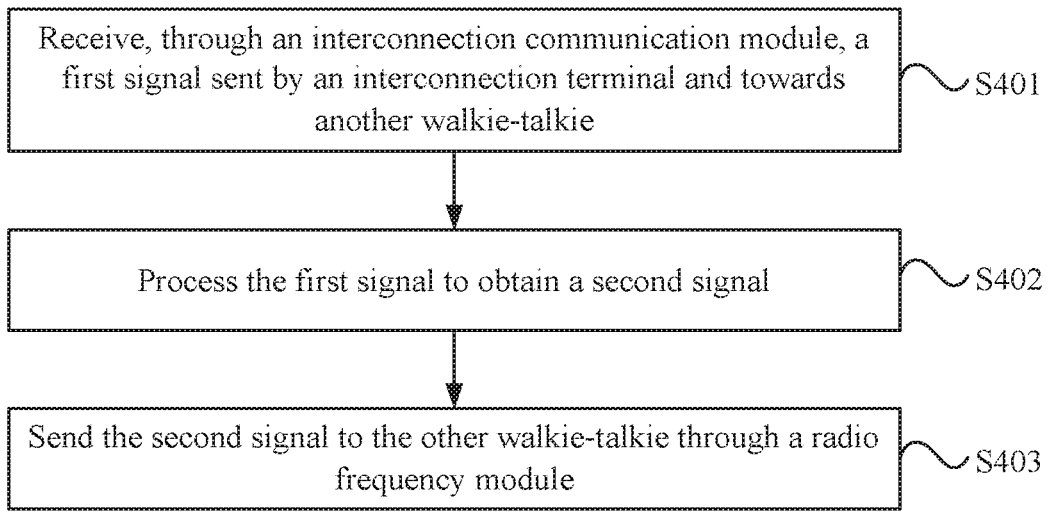
FIG. 4A is a flowchart of a walkie-talkie information transmission method applied to a transmitting end according to embodiment four of the present application.

This embodiment may be applied to an application scenario where information interactions are performed between interconnection terminals without mobile network signal coverage. The method may be performed by a walkie-talkie provided by the embodiments of the present application and may be implemented by at least one of hardware and software deployed in the walkie-talkie. As shown in FIGS. 2A, 2B and 4A, a walkie-talkie information transmission method applied to a transmitting end includes steps S401 to S403 described below.

In S401, a first signal is received through an interconnection communication module 210, where the first signal is sent by an interconnection terminal 400 and towards another walkie-talkie 200'.

In S402, the first signal is processes to obtain a second signal.

In S403, the second signal is sent to the other walkie-talkie 200' through a radio frequency module 220.

In an embodiment, the second signal is sent to the other walkie-talkie 200' through the radio frequency module includes: the second signal is sent to the other walkie-talkie 200' in an analog communication mode or a digital communication mode.

Figure 4B:
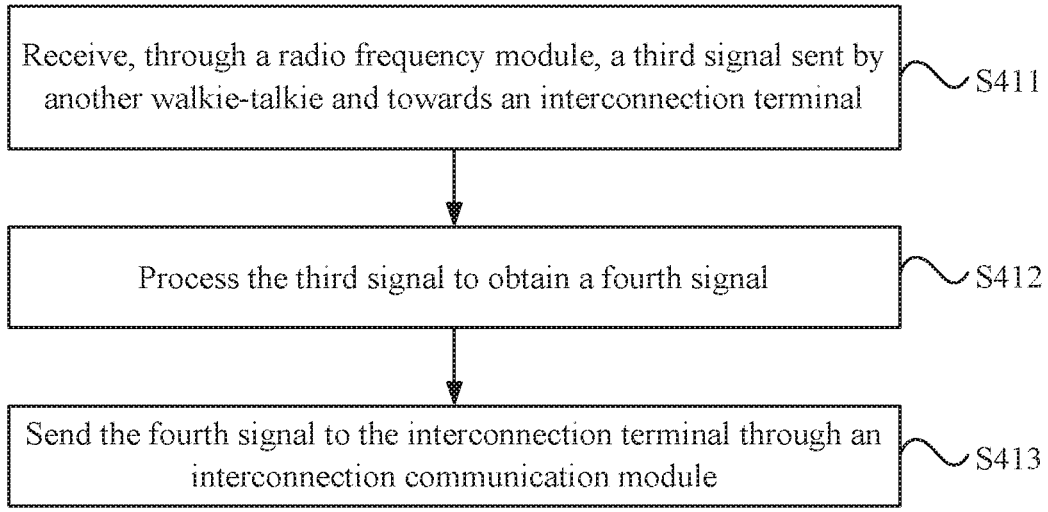
FIG. 4B is a flowchart of a walkie-talkie information transmission method applied to a receiving end according to embodiment four of the present application.

As shown in FIG. 4B, a walkie-talkie information transmission method applied to a receiving end includes steps S411 to S413 described below.

In S411, a third signal is received through the radio frequency module 220, where the third signal is sent by the other walkie-talkie 200' and towards the interconnection terminal 400.

In S412, the third signal is processes to obtain a fourth signal.

In S413, the fourth signal is sent to the interconnection terminal 400 through the interconnection communication module 210.

The interconnection terminal 400 has pre-established a short-range communication connection with the interconnection communication module 210.

The walkie-talkie information transmission method in this embodiment enables mobile phones 400A and 400B to implement a walkie-talkie function similar to walkie-talkies 200A and 200B by the method. When there is no mobile communication network coverage and a user A and a user B cannot perform information interactions at a remote distance by use of the mobile phone 400A and the mobile phone 400B, the mobile phone 400A and the mobile phone 400B can implement the walkie-talkie function through the walkie-talkie 200A and the walkie-talkie 200B so as to perform the information interactions, thereby solving the problem that the mobile phone 400A and the mobile phone 400B cannot provide the user A and the user B with radio communication services in the application scenario without the mobile communication network coverage. In the application scenario with the mobile communication network coverage, the user A and the user B perform the information interactions through the walkie-talkie 200A and the walkie-talkie 200B, certain radio communication costs can be saved especially when a specific group needs to communicate with each other frequently within a wide range.

In an embodiment, a type of each of the first signal and the third signal includes a voice, a text, a geographic position, an image or a video.

In an embodiment, the interconnection communication module 210 includes at least one of a Bluetooth communication module, a wife communication module, an infrared communication module or a near filed communication (NFC) connection module.

Figure 4C:
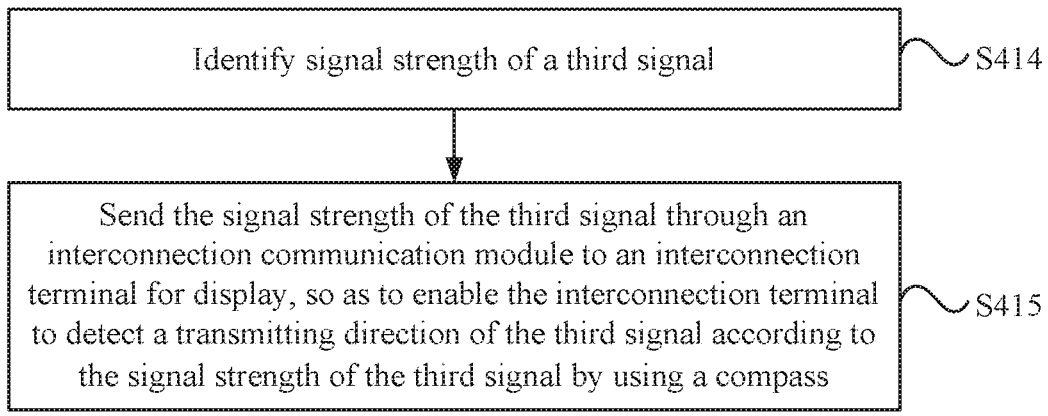
FIG. 4C is a flowchart of another walkie-talkie information transmission method applied to a receiving end according to embodiment four of the present application.

In an embodiment, as shown in FIG. 4C, after the third signal which is sent by the other walkie-talkie and towards the interconnection terminal is received, the method may further include steps S414 and S415.

In S414, signal strength of the third signal is identified.

In S415, the signal strength of the third signal is sent through the interconnection communication module 210 to the interconnection terminal 400 for display, so as to enable the interconnection terminal 400 to detect a transmitting direction of the third signal according to the signal strength of the third signal by using a compass.

The walkie-talkie and the walkie-talkie information transmission method provided by the embodiments can implement signal identification and can identify the signal strength of the signal transmitted by the other walkie-talkie and transmit the signal to the mobile phone, so that the signal strength is displayed on the mobile phone through the APP and the transmitting direction of the signal is detected through the APP in conjunction with the compass in the mobile phone.

Figure 4D:
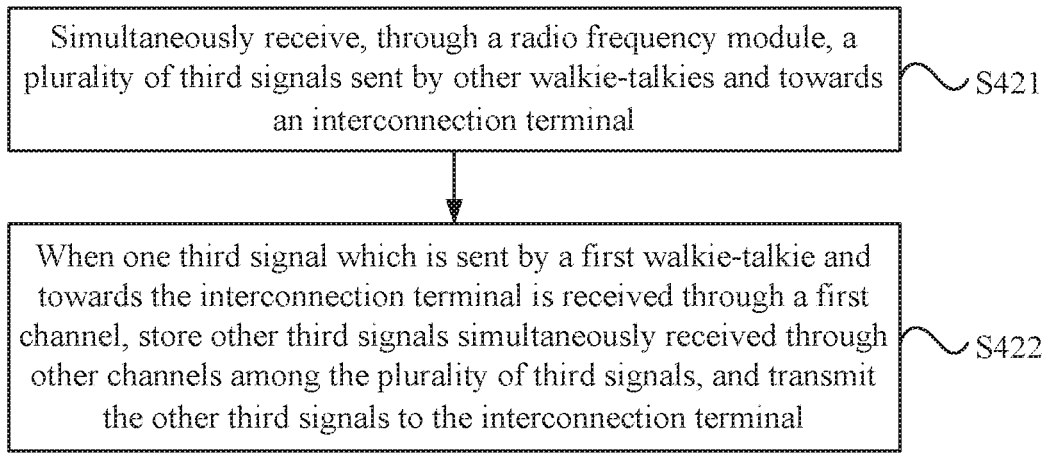
FIG. 4D is a flowchart of another walkie-talkie information transmission method applied to a receiving end according to embodiment four of the present application.

This embodiment may be further applied to the case where the radio frequency module 220 is configured to perform multi-channel communication. As shown in FIG. 4D, the walkie-talkie information transmission method applied to the receiving end in this embodiment further includes steps S421 and S422 described below.

In S421, a plurality of third signals is received through the radio frequency module 220, where the plurality of third signals is sent by other walkie-talkies 100' and towards the interconnection terminal 400.

In S422, when one third signal which is sent by a first walkie-talkie and towards the interconnection terminal 400 is received through a first channel, other third signals simultaneously received through other channels among the plurality of third signals are stored and transmitted to the interconnection terminal 400.

When the walkie-talkie and the walkie-talkie information transmission method provided by the embodiments are used, a device (the walkie-talkie) can simultaneously receive multiple channels of signals by use of the multi-channel communication. When the device communicates with one of the other walkie-talkies, the device may receive and store signals transmitted by other devices and transmit the signals to the mobile phone. Alternatively, when multiple devices perform group communication, they can simultaneously receive information, avoiding the case where information from only one device can be received through a single channel.

Embodiment Five

Based on embodiment four, step S402 in embodiment four, that is, the step of processing the first signal to obtain the second signal may include that if it is determined that a type of the first signal is a voice, an audio processing module is controlled to perform audio processing on the first signal to obtain the second signal.

Step S412 in embodiment four, that is, the step of processing the third signal to obtain the fourth signal may include that if it is determined that a type of the third signal is the voice, the audio processing module is controlled to perform the audio processing on the third signal to obtain the fourth signal.

Figure 5A:
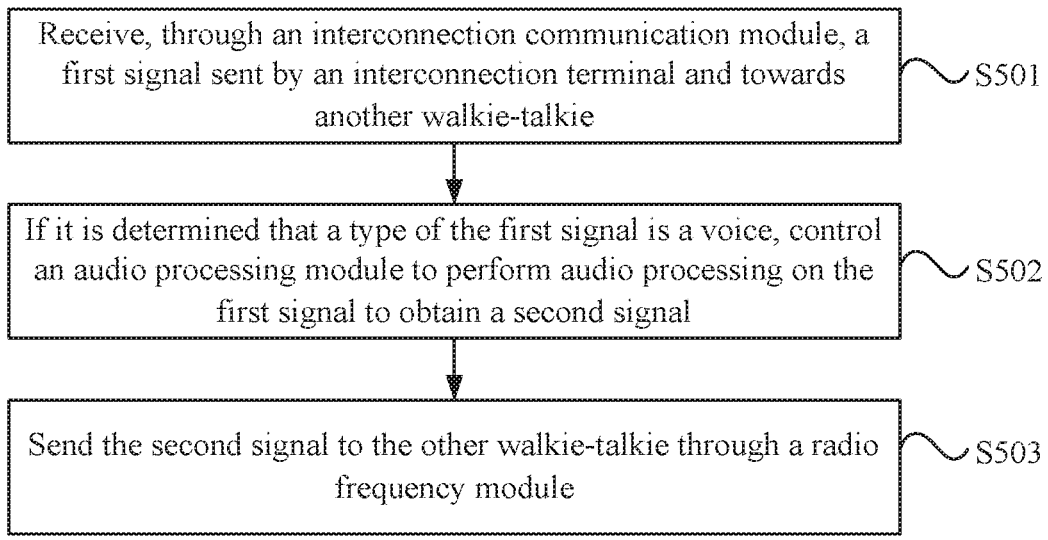
FIG. 5A is a flowchart of a walkie-talkie information transmission method applied to a transmitting end according to embodiment five of the present application.

As shown in FIGS. 2A, 2B and 5A, a walkie-talkie information transmission method applied to a transmitting end includes steps S501 to S503 described below.

In S501, the first signal is received through an interconnection communication module 210, where the first signal is sent by an interconnection terminal 400 and towards another walkie-talkie 200'.

In S502, if it is determined that the type of the first signal is the voice, the audio processing module 250 is controlled to perform the audio processing on the first signal to obtain the second signal.

In S503, the second signal is sent to the other walkie-talkie 200' through a radio frequency module 220.

Figure 5B:
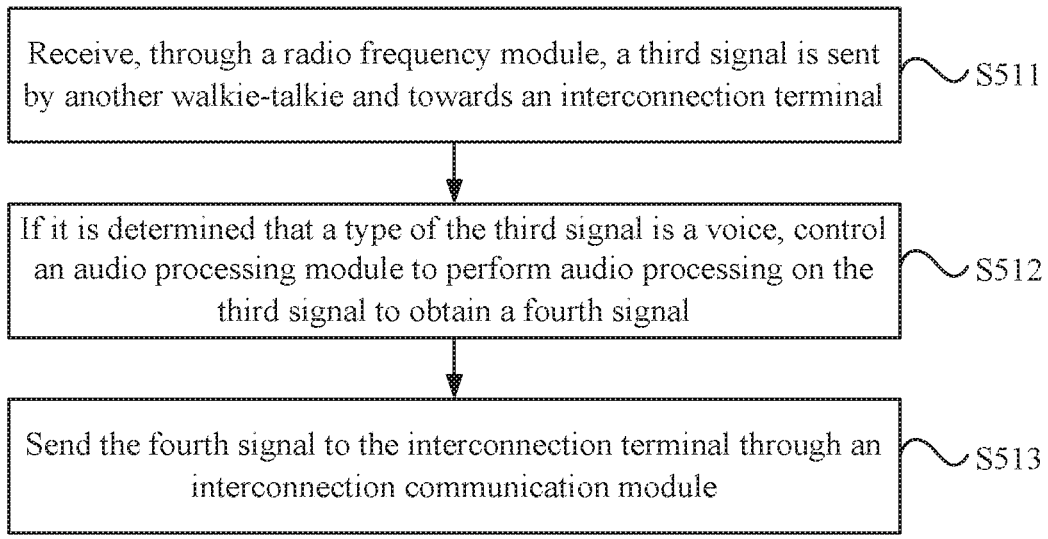
FIG. 5B is a flowchart of a walkie-talkie information transmission method applied to a receiving end according to embodiment five of the present application.

As shown in FIGS. 2A, 2B and 5B, a walkie-talkie information transmission method applied to a receiving end includes steps S511 to S513 described below.

In S511, the third signal is received through the radio frequency module 210, where the third signal is sent by the other walkie-talkie 200' and towards the interconnection terminal 400.

In S512, if it is determined that the type of a third signal is the voice, the audio processing module 250 is controlled to perform the audio processing on the third signal to obtain the fourth signal.

In S513, the fourth signal is sent to the interconnection terminal 400 through the interconnection communication module 210.

Based on the embodiments described above, the walkie-talkie information transmission method in this embodiment further includes a step described below.

With reference to FIGS. 3A and 3B, if it is determined that a received signal is a fifth signal sent by another walkie-talkie 300A and towards another terminal 400B, a relay module 360 is controlled to perform relay processing on the fifth signal to obtain a sixth signal, and the sixth signal is sent to another walkie-talkie 300B through the radio frequency module 320.

Based on the embodiments described above, the walkie-talkie information transmission method in this embodiment further includes steps described below.

With reference to FIG. 1A, a seventh signal is received through the interconnection communication module 110, where the seventh signal is sent by the interconnection terminal 400 and towards the walkie-talkie 100.

The seventh signal is parsed to obtain a parsing result.

A system parameter of the walkie-talkie 100 is adjusted based on the parsing result and according to a preset adjustment rule, where the system parameter includes at least one of: a country, a language, a transmitting frequency, a receiving frequency, a channel, a transmitting CTC, a receiving CTC, a volume or an SQ.

The walkie-talkie according to any embodiment of the present application may perform the method according to any embodiment of the present application. Considering that the method according to any embodiment of the present application has the beneficial effects of the walkie-talkie according to the corresponding embodiment of the present application, for the beneficial effects of the method according to the embodiments of the present application, reference is made to the walkie-talkie according to the corresponding embodiments of the present application, and details are not described here again.

What is claimed is:

1. A walkie-talkie, comprising:
an interconnection communication module, which is configured to establish short-range communication with an interconnection terminal;
a radio frequency module, which is configured to establish radio frequency communication with other walkie-talkies;
an internal communication interface; and
a processor, which is connected to the interconnection communication module and the radio frequency module through the internal communication interface and is configured to:
receive, through the interconnection communication module, a first signal sent by the interconnection terminal towards the other walkie-talkies, process the first signal to obtain a second signal, and send the second signal to the other walkie-talkies through the radio frequency module; or
receive, through the radio frequency module, a third signal sent by each of the other walkie-talkies towards the interconnection terminal, process the third signal to obtain a fourth signal, and send the fourth signal to the interconnection terminal through the interconnection communication module;
wherein the processor is further configured to:
receive, through the interconnection communication module, a fifth signal sent by the interconnection terminal towards the walkie-talkie;
parse the fifth signal to obtain a parsing result; and
adjust, based on the parsing result and according to a preset adjustment rule, a system parameter of the walkie-talkie, wherein the system parameter comprises at least one of: a country, a language, a transmitting frequency, a receiving frequency, a channel, a transmitting continuous tone-coded squelch system, a receiving continuous tone-coded squelch system, a volume or a squelch detector.

2. The walkie-talkie of claim 1, wherein types of the first signal and the third signal comprise:
a voice, a text, a geographic position, an image or a video.

3. The walkie-talkie of claim 2, further comprising:
an audio processing module, which is connected to the interconnection communication module and the radio frequency module through the internal communication interface;
wherein the processor is further configured to:
in response to determining that the type of the first signal is the voice, control the audio processing module to perform audio processing on the first signal to obtain the second signal; or
in response to determining that the type of the third signal is the voice, control the audio processing module to perform audio processing on the third signal to obtain the fourth signal.

4. The walkie-talkie of claim 1, further comprising:
a relay module, which is connected to the radio frequency module through the internal communication interface;

wherein the processor is further configured to:
in response to determining that a received signal is a sixth signal which is sent by a first walkie-talkie among the other walkie-talkies and is towards an interconnection terminal corresponding to a second walkie-talkie among the other walkie-talkies, control the relay module to perform relay processing on the sixth signal to obtain a seventh signal, and send the seventh signal to the second walkie-talkie among the other walkie-talkies through the radio frequency module.

5. The walkie-talkie of claim 1, further comprising:
a power module, which is configured to supply power to a plurality of modules in the walkie-talkie, wherein the power module further comprises an external power supply interface and is configured to supply power to a portable device connected to the external power supply interface.

6. The walkie-talkie of claim 1, wherein the interconnection communication module comprises at least one of:
a Bluetooth communication module, a wireless fidelity (wifi) communication module, an infrared communication module or a near filed communication (NFC) connection module.

7. The walkie-talkie of claim 1, further comprising:
a distress button, which is configured to generate a press operation signal in response to a user's press operation, and send the press operation signal to the interconnection terminal through the interconnection communication module to enable the interconnection terminal to identify the press operation signal and generate a distress signal; and
a distress function module, which is configured to receive the distress signal from the interconnection terminal through the interconnection communication module, send the distress signal to the other walkie-talkies through the radio frequency module, and receive distress signals from the other walkie-talkies.

8. A walkie-talkie information transmission method, applied to a first walkie-talkie comprising an interconnection communication module and a radio frequency module, and comprising:
receiving, through the interconnection communication module, a first signal sent by an interconnection terminal towards a second walkie-talkie, wherein the interconnection terminal pre-establishes a short-range communication connection with the interconnection communication module, processing the first signal to obtain a second signal, and sending the second signal to the second walkie-talkie through the radio frequency module; or
receiving, through the radio frequency module, a third signal sent by a second walkie-talkie towards an interconnection terminal, processing the third signal to obtain a fourth signal, and sending the fourth signal to the interconnection terminal through the interconnection communication module;
wherein the method further comprises:
receiving, through the interconnection communication module, a fifth signal sent by the interconnection terminal towards the first walkie-talkie;
parsing the fifth signal to obtain a parsing result; and
adjusting, based on the parsing result and according to a preset adjustment rule, a system parameter of the first walkie-talkie, wherein the system parameter comprises at least one of: a country, a language, a transmitting frequency, a receiving frequency, a channel, a transmitting continuous tone-coded squelch system, a receiving continuous tone-coded squelch system, a volume or a squelch detector.

9. The method of claim 8, wherein types of the first signal and the third signal comprise: a voice, a text, a geographic position, an image or a video.

10. The method of claim 9, wherein processing the first signal to obtain the second signal comprises:
in response to determining that the type of the first signal is the voice, controlling an audio processing module to perform audio processing on the first signal to obtain the second signal; and
wherein processing the third signal to obtain the fourth signal comprises:
in response to determining that the type of the third signal is the voice, controlling the audio processing module to perform the audio processing on the third signal to obtain the fourth signal.

11. The method of claim 8, further comprising:
in response to determining that a received signal is a sixth signal sent by the second walkie-talkie towards an interconnection terminal corresponding to a third walkie-talkie, controlling a relay module in the first walkie-talkie to perform relay processing on the sixth signal to obtain a seventh signal, and sending the seventh signal to the third walkie-talkie through the radio frequency module.

12. The method of claim 8, wherein the radio frequency module is configured to perform multi-channel communication, and the method further comprises:
simultaneously receiving, through the radio frequency module, a plurality of third signals sent by a plurality of second walkie-talkies towards the interconnection terminal; and
when receiving, through a first channel, one third signal sent by one of the plurality of second walkie-talkies towards the interconnection terminal, storing other third signals simultaneously received through other channels, and transmitting the other third signals to the interconnection terminal.

13. The method of claim 8, further comprising:
identifying signal strength of the third signal; and
sending the signal strength of the third signal to the interconnection terminal through the interconnection communication module for display, so as to enable the interconnection terminal to detect a transmitting direction of the third signal according to the signal strength of the third signal by using a compass.

14. The method of claim 8, wherein sending the second signal to the second walkie-talkie through the radio frequency module comprises:
sending the second signal to the second walkie-talkie through the radio frequency module in an analog communication mode or a digital communication mode.

15. The method of claim 8, further comprising:
generating a press operation signal in response to a user's press operation on a distress button, and sending the press operation signal to the interconnection terminal through the interconnection communication module, so as to enable the interconnection terminal to identify the press operation signal and generate a distress signal; and
receiving the distress signal from the interconnection terminal through the interconnection communication module, sending the distress signal to a plurality of second walkie-talkies through the radio frequency module, and receiving distress signals from the plurality of second walkie-talkies.

16. An electronic device, comprising:
an interconnection communication module, which is configured to establish short-range communication with an interconnection terminal;
a radio frequency module, which is configured to establish radio frequency communication with other electronic devices;
an internal communication interface; and
a processor, which is connected to the interconnection communication module and the radio frequency module through the internal communication interface and is configured to:
receive, through the interconnection communication module, a first signal sent by the interconnection terminal towards the other electronic devices, process the first signal to obtain a second signal, and send the second signal to the other electronic devices through the radio frequency module; or
receive, through the radio frequency module, a third signal sent by each of the other electronic devices towards the interconnection terminal, process the third signal to obtain a fourth signal, and sending the fourth signal to the interconnection terminal through the interconnection communication module;
wherein the processor is further configured to:
receive, through the interconnection communication module, a fifth signal sent by the interconnection terminal towards the electronic device;
parse the fifth signal to obtain a parsing result; and
adjust, based on the parsing result and according to a preset adjustment rule, a system parameter of the electronic device, wherein the system parameter comprises at least one of: a country, a language, a transmitting frequency, a receiving frequency, a channel, a transmitting continuous tone-coded squelch system, a receiving continuous tone-coded squelch system, a volume or a squelch detector.

17. The electronic device of claim 16, further comprising:
a relay module, which is connected to the radio frequency module through the internal communication interface;
wherein the processor is further configured to:
in response to determining that a received signal is a sixth signal which is sent by a first electronic device among the other electronic devices and is towards an interconnection terminal corresponding to a second electronic device among the other electronic devices, control the relay module to perform relay processing on the sixth signal to obtain a seventh signal, and send the seventh signal to the second electronic device among the other electronic devices through the radio frequency module.

18. An information transmission method, applied to an electronic device according to claim 16 which is a first electronic device, and comprising:
receiving, through the interconnection communication module, a first signal sent by an interconnection terminal towards a second electronic device, wherein the interconnection terminal pre-establishes a short-range communication connection with the interconnection communication module, processing the first signal to obtain a second signal, and sending the second signal to the second electronic device through the radio frequency module; or
receiving, through the radio frequency module, a third signal sent by a second electronic device towards an interconnection terminal, processing the third signal to obtain a fourth signal, and sending the fourth signal to the interconnection terminal through the interconnection communication module;
wherein the method further comprises:
receiving, through the interconnection communication module, a fifth signal sent by the interconnection terminal towards the first electronic device;
parsing the fifth signal to obtain a parsing result; and
adjusting, based on the parsing result and according to a preset adjustment rule, a system parameter of the first electronic device, wherein the system parameter comprises at least one of: a country, a language, a transmitting frequency, a receiving frequency, a channel, a transmitting continuous tone-coded squelch system, a receiving continuous tone-coded squelch system, a volume or a squelch detector.

* * * * *